K. E. SALZWEDEL 3,487,812

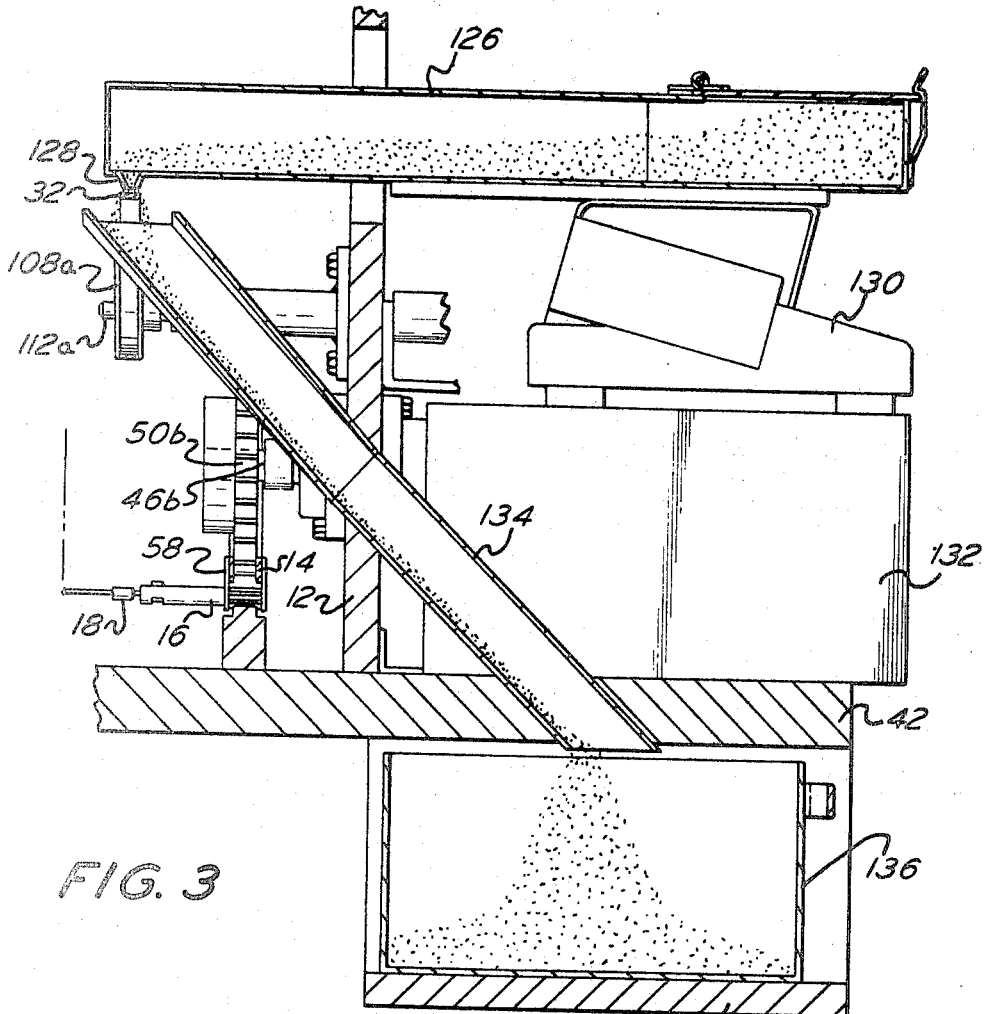
FIG. 3
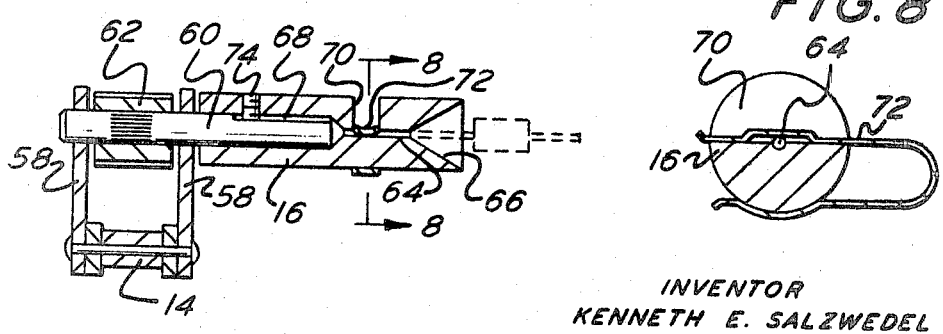
FIG. 7
FIG. 8
INVENTOR
KENNETH E. SALZWEDEL
BY
ATTORNEY Jan. 6, 1970

APPARATUS FOR COATING ELECTRICAL COMPONENTS BY
ROTATING THE SAME IN A MOLTEN FILM

Filed Jan. 17, 1967

INVENTOR
KENNETH E. SALZWEDEL

BY
ATTORNEY

United States Patent Office 3,487,812
Patented Jan. 6, 1970

3,487,812
APPARATUS FOR COATING ELECTRICAL COMPONENTS BY ROTATING THE SAME IN A MOLTEN FILM
Kenneth E. Salzwedel, Burlington, Iowa, assignor to TRW Inc., a corporation of Ohio
Filed Jan. 17, 1967, Ser. No. 609,897
Int. Cl. B05c 1/14
U.S. Cl. 118—232       8 Claims

ABSTRACT OF THE DISCLOSURE

A method and apparatus for coating electric components with an insulating protective jacket of a plastic material wherein the electrical components are individually mounted on a continuously moving endless conveyor. A layer of particles of a plastic coating material is provided on the surface of a continuously moving endless belt which carries the layer of the coating material to a coating station. The conveyor carries the electrical components through a heater where the electrical components are heated to a temperature at least as high as the fusion temperature of the plastic coating material. The heated electrical components are then carried to the coating station where the body portion of each of the electrical components is brought into contact with and rolled over the layer of the plastic coating material. The plastic coating material adheres and fuses to the heated body portions of the electrical components to provide a protective jacket of the plastic material completely around the body portions of the electrical component. The coated electrical components are then removed from the conveyor.

BACKGROUND

Many electrical components, such as resistors, require a protective coating of an electrical insulating material, such as a plastic. The protective coating mechanically protects the component from being damaged, and electrically insulates the active element of the component from other components in the electrical circuit in which the component is used. The electrical properties of many electrical components, particularly resistors, are often adversely affected when the component is exposed to the atmosphere, and particularly when exposed to the moisture in the atmosphere. Therefore, the protective coating should serve the additional purpose of protecting the active element of the component from the atmosphere, and particularly the moisture in the atmosphere.

The prior art includes a method and apparatus for coating electrical components with an insulating jacket of a plastic material wherein the electrical components are heated and then passed through a shower of finely divided particles of the plastic material. The plastic particles contacting the heated electrical component fuse to the component to form the plastic coating. The electrical components are rotated as they pass through the shower so as to provide a uniform coating of the plastic completely around the component. Although the plastic coating provided by the method and apparatus of the prior art has all of the protective characteristics desired for such a coating, it has been found that the method and apparatus for obtaining the coating have certain disadvantages.

The specifications prescribed for electrical components by the user of the components set certain limitations on the thickness of the protective coating for the components, and prohibit any of the plastic material on the terminal wires of the component. In the use of the shower of the plastic particles, it has been found to be difficult to control the thickness of the plastic coating. Also, with the plastic particles falling onto the electrical components, there is a tendency for the plastic particles to splatter and fuse onto the terminal wires of the components. This has required an inspection of the coated components and a removal of any splattered plastic by a subsequent operation. Another disadvantage arises from the fact that it requires the use of considerably more of the plastic material to form the shower of the plastic particles than is actually coated on the electrical components. Although the apparatus includes means for recirculating the excess plastic material, there is a loss of some of the material which adds to the cost of the operation.

It is an object of the present invention to provide a novel apparatus for coating electrical components with particles of a plastic material which are fused onto the component to form a protective plastic jacket.

It is still another object of the present invention to provide an apparatus for coating electric components with a protective plastic jacket which permits ease of controlling the thickness of the plastic coating.

It is a further object of the present invention to provide an apparatus for coating electrical components with a protective plastic jacket which accurately controls the application of the plastic material so that none of the plastic material is coated on the terminal wires of the components.

It is a still further object of the present invention to provide an apparatus for coating electrical components with a protective plastic jacket in which there is a maximum utilization of the coating material so as to minimize any losses of the material during the coating operation.

Other projects will appear hereinafter.

For the purpose of illustrating the invention, there is shown in the drawings a form which is presently preferred; it being understood, however, that this invention is not limited to the precise arrangements and instrumentalities shown.

FIGURE 3 is a sectional view taken along line 3—3 of FIGURE 1.

FIGURE 7 is a sectional view of an electrical component-holding chuck taken along line 7—7 of FIGURE 1.

FIGURE 8 is a sectional view taken along line 8—8 of FIGURE 7.

BRIEF DESCRIPTION OF INVENTION

Figure 1:
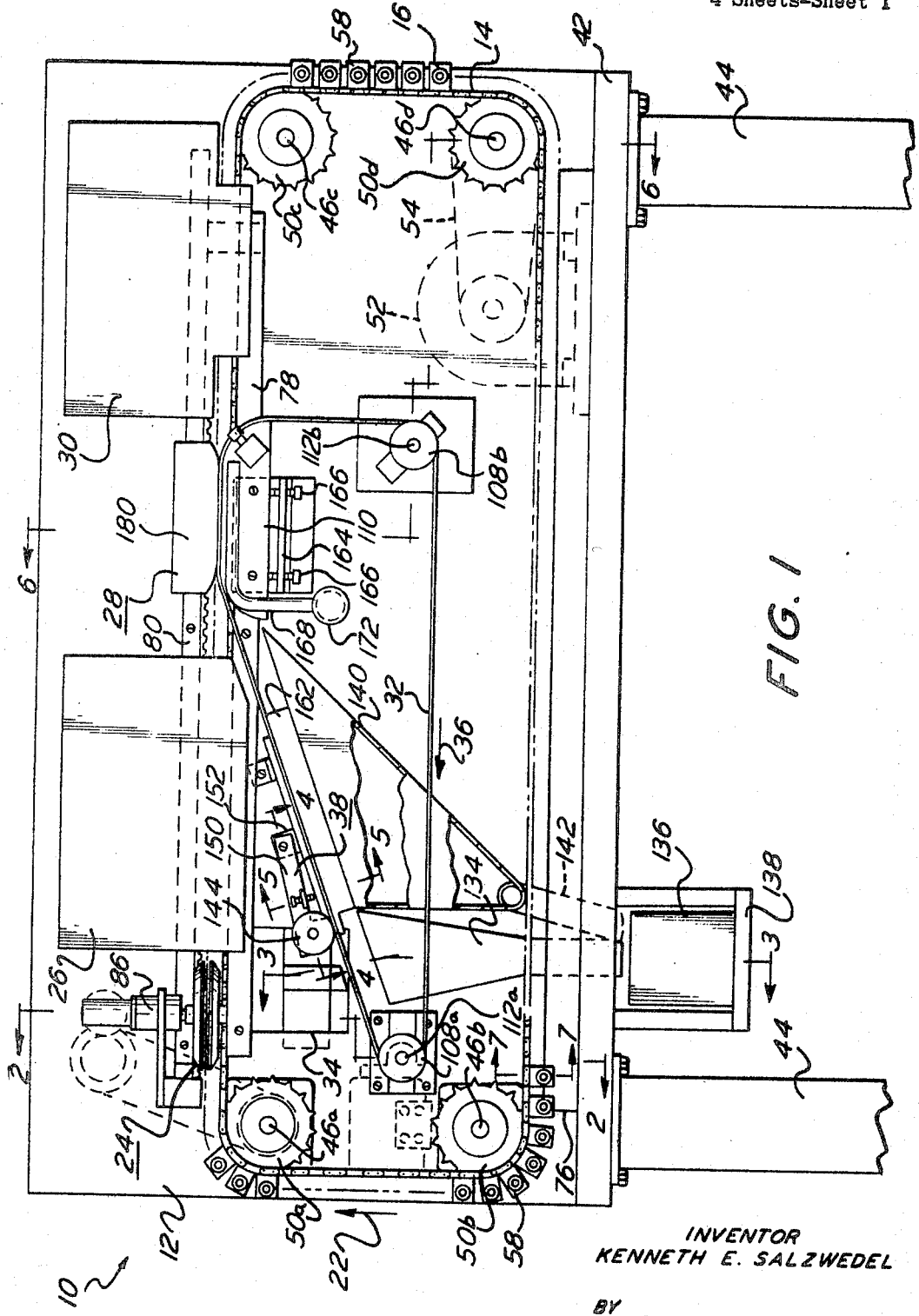
FIGURE 1 is a front plan view of the apparatus of the present invention.
Figure 2:
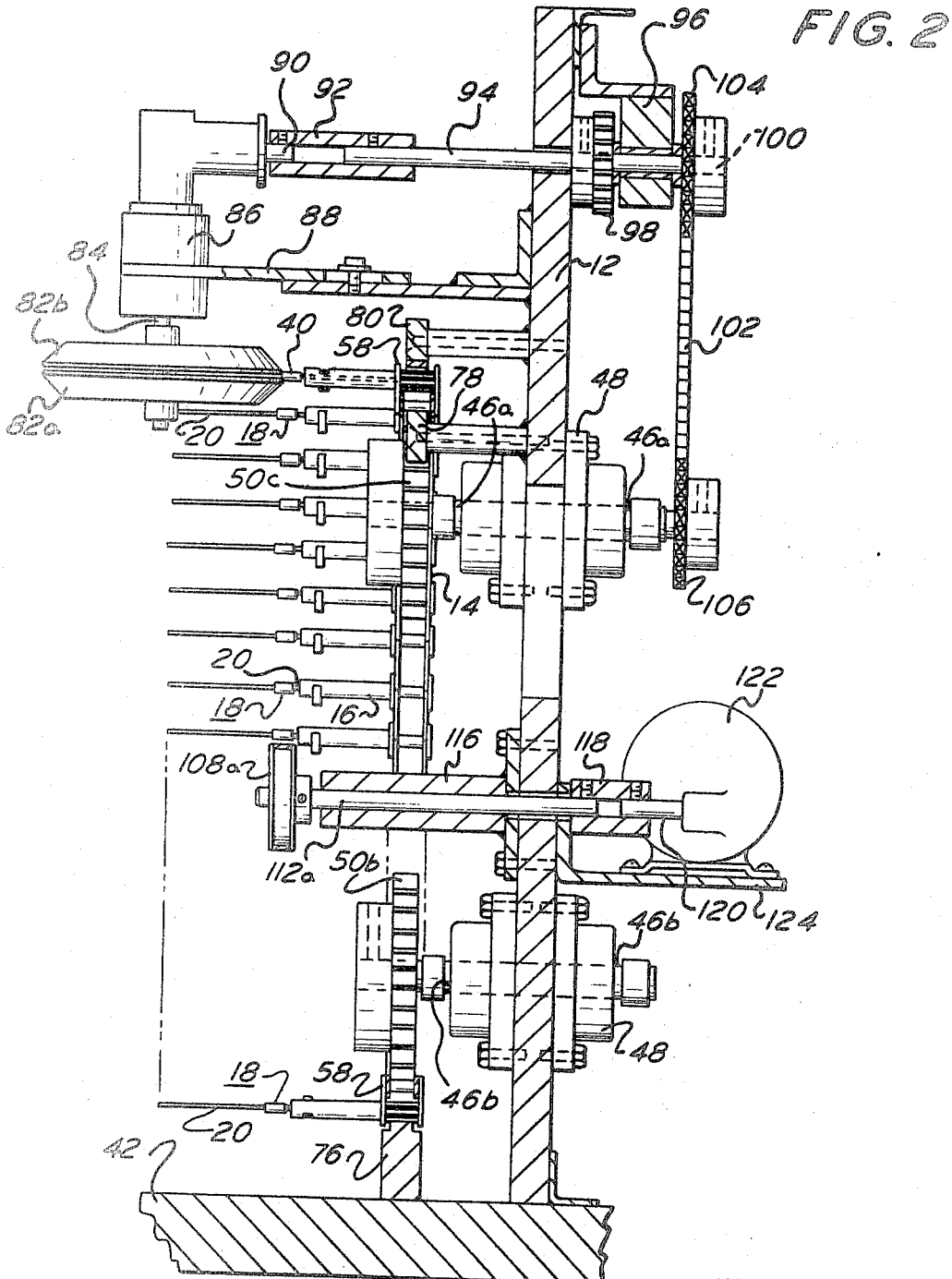
FIGURE 2 is a sectional view taken along line 2—2 of FIGURE 1.

Referring initially to FIG. 1, the coating apparatus of the present invention is generally designated as 10. In general, coating apparatus 10 comprises a vertical supporting plate 12 on which is supported an endless chain 14 for continuous movement in a vertical plane parallel to the supporting plate 12. The endless chain 14 carries a plurality of chucks 16 on which are individually mounted the electrical components 18 to be coated. As shown in FIGURE 2, each of the electrical components 18 is supported in a separate chuck 16 by a terminal wire 20 of the electrical component with the electrical component extending horizontally away from the endless chain 14. The endless chain 14 is moved in the direction of the arrow 22 in FIGURE 1 so as to carry the electrical components 18 sequentially through a position adjusting mechanism 24, a first heater 26, a coating station 28 and a second heater 30.

A flat, narrow, endless belt 32 is mounted on the supporting plate 12 for continuous movement in a vertical plane parallel to the supporting plate. A feeder 34 feeds the particles of the plastic coating material to the uppermost flat surface of the endless belt 32 to provide a layer of the plastic coating material on the belt. The endless belt is moved in the direction of the arrow 36 so as to carry the layer of the plastic coating material to the coating station 28. However, the layer of the coating material is first carried past a doctor mechanism 38 which controls the thickness of the layer of the plastic coating material. At the coating station 28 (see FIGURE 6) the body portion 40 of each of the electrical components 18 is brought into contact with the layer of the plastic material on the endless belt 32 and the chucks 16 are rotated so as to roll the body portion 40 over the endless belt and contact the entire surface of the boy portion with the plastic material.

As the electrical components 18 are carried through the first heater 26 they are heated to a temperature at least as high as the fusion temperature of the plastic coating material. Thus, when the heated body portion 40 of the electrical components 18 are rolled in the layer of the plastic material on the endless belt 32, the plastic particles adhere and fuse to the body portions 40 so as to provide the protective coating around the body portions. By having an endless belt 32 of a width equal to the length of the body portions 40 of the electrical components 18 and by properly positioning the body portions with respect to the endless belt, the plastic coating is applied only to the body portions leaving the terminal wires 20 of the electrical components 18 bare of any of the plastic. By controlling the thickness of the layer of the plastic material on the endless belt 32, the thickness of the plastic coating on the body portions 40 can be accurately controlled. The coated electrical components 18 are carried through the second heater 30 to insure complete fusion and curing of the plastic coating. After the coated electrical components 18 pass through the second heater 30, they are removed from the chucks 16.

DETAILED DESCRIPTION OF APPARATUS

Figure 6:
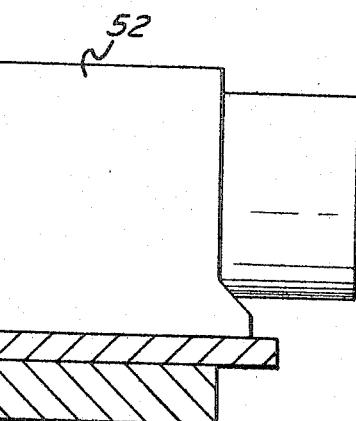
FIGURE 6 is a sectional view taken along line 6—6 of FIGURE 1 showing the coating station of the apparatus of the present invention.

In more detail, the coating apparatus 10 of the present invention comprises a horizontal base plate 42 mounted on legs 44. The supporting plate 12 is mounted on and secured to the base plate 42. A pair of spaced, vertically aligned shafts 46a and 46b extend horizontally through the supporting plate 12 adjacent one side edge thereof, and are rotatably supported in bearings 48 (see FIGURE 2) which are secured to the supported plate 12. A second pair of spaced, vertically aligned shafts 46c and 46d extend horizontally through the supporting plate 12 adjacent the other side edge thereof, and are rotatably supporting in bearings 48 which are secured to the supporting plate 12. The shaft 46c is in horizontal alignment with the shaft 46a, and the shaft 46d is in horizontal alignment with the shaft 46b. Sprocket wheels 50a, 50b, 50c and 50d are mounted on the ends of the shafts 46a, 46b, 46c and 46d, respectively, at the front side of the supporting plate 12. The endless chain 14 extends around and is supported by the sprocket wheels 50a, 50b, 50c and 50d. As shown in FIGURES 1 and 6, an electric motor 52 is mounted on the base plate 42 behind the supporting plate 12. Motor 52 is drivingly connected by an endless chain 54 to a sprocket wheel 56 mounted on the back end of the shaft 46d. Thus, the motor 52 rotates the sprocket wheel 50d which drives the endless chain 14.

At each link of the endless chain 14 a pair of rectangular plates 58—58 are secured to opposite sides of the chain link and extend outwardly from the chain in parallel relation (see FIGURE 7). A separate chuck mounting pin 60 extends horizontally through and is rotatable in aligned holes in each pair of the plates 58. The pin 60 projects beyond the plates 58 on the side away from the supporting plate 12. A small gear 62 is secured by a force fit on each of the pins 60 between the pairs of plates 58. Each of the chucks 16 is a cylindrical member having a small diameter terminal wire-receiving passage 64 extending longitudinally therethrough between the bottom of a conical recess 66 at the front end of the chuck member and a mounting recess 68 extending from the back end of the chuck member. A slot 70 extends transversely across the chuck 16 to the terminal wire receiving passage 64. A U-shaped spring clip 72 fits around the chuck 16 with one arm of the clip extending across the slot 70. The chuck 16 is mounted on the pin 60 with the pin fitting into the recess 68. A set screw 74 is threaded through the chuck and engages the pin to secure the chuck to the pin. Thus, a plurality of the chucks 16 are mounted in parallel relation along the entire length of the endless chain 14 with each of the chucks being rotatable about its own longitudinal axis.

An elongated guide rail 76 is mounted on the base plate 42 beneath endless chain 14 (see FIGURES 1 and 2). As shown in FIGURE 2, the gears 62 on the chuck supporting pins 60 slidably engage the top surface of the guide rail 76 as they move between the sprocket wheel 50d and the sprocket wheel 50b so that the chucks 16 are supported while the electrical components 18 are inserted in and removed from the chucks as will be explained later. A second elongated guide rail 78 is mounted on the supporting plate 12 between the sprocket wheel 50a and the sprocket wheel 50c and beneath the endless chain 14. The endless chain 14 slidably engages the top surface of the guide rail 78 as it moves between the sprocket wheels 50a and 50c so that the chucks 16 are supported during the coating operation. An elongated gear rack 80 is mounted on the supporting plate 12 over the second guide rail 78 and above the endless chain 14. The teeth of the gear rack 80 mesh with the teeth of the gears 62 so that the chucks 16 are rotated about their own axes as they move between the sprocket wheels 50a and 50c.

The position adjusting mechanism 24 comprises a pair of circular plates 82a and 82b mounted in spread apart, parallel relation on the bottom end of a vertical shaft 84 (see FIGURE 2). Shaft 84 is rotatably supported in a bearing 86 on the end of an adjustable bracket 88 mounted on and extending from the supporting plate 12. The plates 82a and 82b are positioned so that the space between the plates is in horizontal alignment with the ends of the chucks 16 as they move over the upper guide rail 78. The spacing between the plates 82a and 82b is slightly greater than the diameter of the terminal wires 20 of the electrical components 18. Shaft 84 is drivingly connected at its upper end to a horizontal shaft 90 through suitable gearing, not shown. Shaft 90 is connected by an adjustable coupling sleeve 92 to the end of a drive shaft 94. Drive shaft 94 extends through to the supporting plate 12 and is rotatably supported in a bearing block 96 which is mounted on the back of the supporting plate 12. A gear 98 mounted on the drive shaft 94 meshes with a gear (not shown) on the end of a stub shaft 100 which is parallel to the drive shaft 94 and is rotatably supported in the bearing block 96. An endless drive chain 102 extends around a sprocket wheel 104 on the back end of the stub shaft 100 and a sprocket wheel 106 on the back end of the shaft 46a. Thus, the movement of the endless chain 14 rotates the plate 82a and 82b of the position adjusting mechanism 24.

Endless belt 32 extends around two horizontally aligned pulley 108a and 108b and over the upper edge of a supporting shoe 110 of the coating station 28. Pulleys 108a and 108b are mounted on the ends of shafts 112a and 112b resupectively. Shaft 112b is supported in a bearing 114 which is mounted on the supporting plate 12 (see FIGURE 6) and shaft 112a is supported in a bearing 116 mounted on the supporting plate 12 (see FIGURE 2). Shaft 112a extends through the supporting plate 12 and is connected at its back end by a sleeve coupling 118 to the output shaft 120 of a motor 122. Motor 122 is seated on a bracket 124 mounted on the back side of the supporting plate 12. Thus, the motor 122 drives the endless belt 32.

Referring to FIGURE 3, the feeder 34 of the plastic coating material comprises an enclosed hopper 126 extending horizontally through the supporting plate 12 and over the endless belt 32 at a position just beyond the pulley 108a. A feeder nozzle 128 extends downwardly from an opening in the bottom of the feeder hopper to the top surface of the endless belt 32 so as to direct the particles of the plastic coating material from the hopper 126 to the surface of the endless belt. The feeder hopper 126 is mounted on an electrical vibrator 130 which vibrates the hopper so as to move the plastic coating material from the back of the hopper to the feeder nozzle. The vibrator 130 is seated on a support 132 which is secured to the base plate 42.

An overflow return funnel 134 extends from beneath the endless belt 34 in the area beneath the feeder nozzle 128 diagonally through the supporting plate 12 and the base plate 42 to a collector can 136. The upper end of the funnel 134 is of an area to extend across the open end of the feeder nozzle 128 and beyond the side edges of the endless belt 32 so as to catch any excess of the plastic coating material which may fall from the endless belt and deliver such excess material to the collector can 136. The collector can 136 is seated on a shelf 138 mounted beneath the base plate 42. A second funnel 140 (see FIGURE 1) is mounted beneath the endless belt 32 and extends from the funnel 134 to the coating station 28. The upper end of the funnel 140 extends beyond the side edges of the endless belt 32 so as to catch any of the plastic coating material which may fall from the endless belt. A tube 142 extends from the bottom of the funnel 140 to the collector can 136 so as to deliver any of the plastic coating material which may fall into the funnel 140 to the can.

Figure 4:
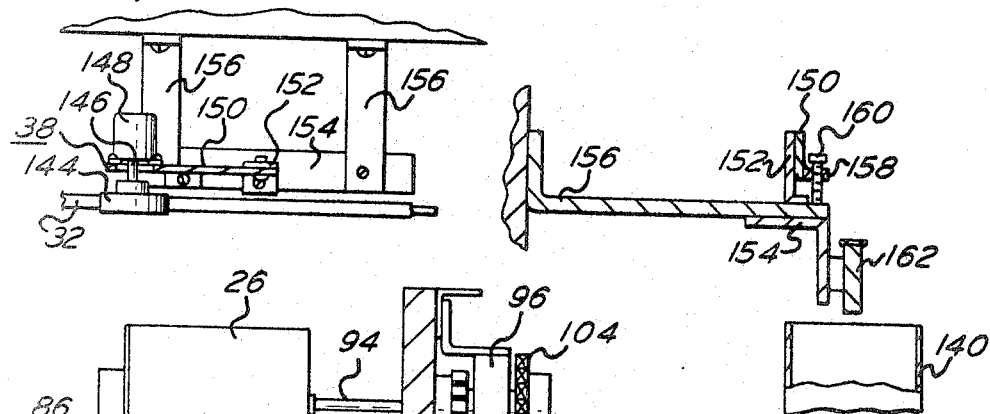
FIGURE 4 is a top plan view taken along line 4—4 of FIGURE 1 showing the doctor mechanism for controlling the amount of coating material supplied for the coating operation.
Figure 5:
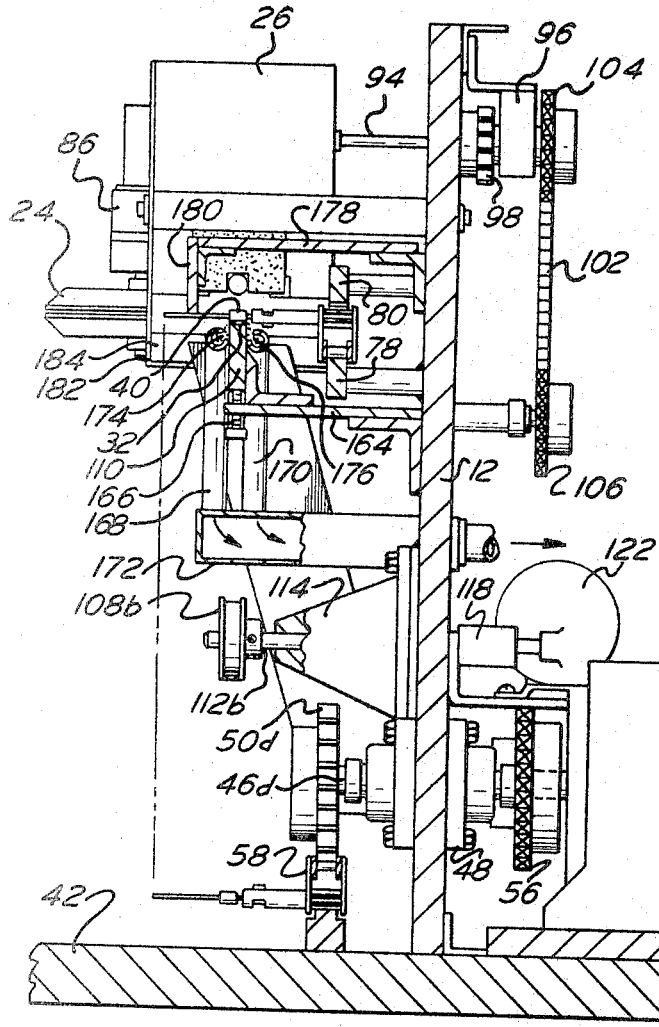
FIGURE 5 is a sectional view taken along line 5—5 of FIGURE 1.

Referring to FIGURES 1 and 4, the doctor mechanism 38 comprises a doctor wheel 144 positioned over the top surface of the endless belt 32 just beyond the feeder 34 and mounted on the end of the output shaft 146 of a small electric motor 148. The motor 148 is mounted on one end of an arm 150 which is pivotally mounted at its other end on a post 152 for pivotation in a vertical plane. The post 152 is mounted on a plate 154 which extends parallel to the endless belt 32 and is secured to the mounting plate 12 by brackets 156. A lug 158 extends outwardly from the lower edge of the arm 150 and a screw 160 is threaded downwardly through the lug 158 and engages the plate 154 (see FIGURE 5). By rotating the screw 160, the arm 150 can be pivoted to adjust the distance between the periphery of the doctor wheel 144 and the top surface of the endless belt 32. A supporting rail 162 which is narrower than the endless belt 32, is secured to the plate 154 and extends beneath the endless belt from beneath the doctor wheel 144 toward the coating station 28.

Referring to FIGURES 1 and 6, the coating station 28 includes the supporting shoe 110 over which the endless belt 32 passes and which is positioned directly beneath the path of travel of the body portion 40 of the electrical components 18. The supporting shoe 110 is mounted on a bracket 164 which is secured to the supporting plate 12 (see FIGURE 6). The supporting shoe 110 is mounted on the bracket 164 so that its position can be adjusted vertically, and the supporting shoe is seated on a pair of adjustment screws 166 which are threaded upwardly through the bracket. A pair of collector tubes 168 and 170 extend horizontally along opposite sides of the supporting shoe 110 adjacent the upper edge thereof. One end of each of the collector tubes 168 and 170 is closed and the other end of each extends downwardly into a pipe 172. The pipe 172 extends through the supporting plate 12 and is connected to a suitable exhaust means, not shown. Each of the collector tubes 168 and 170 has a longitudinally extending slot 174 and 176 respectively therethrough at a point just above the point of tangency with the supporting shoe 164 (see FIGURE 6). A bracket 178 is secured to the supporting plate 12 (see FIGURE 6) and extends over and beyond the supporting shoe 110. A guide plate 180 is secured to the end of the bracket 178 and extends downwardly to engage the free terminal wires 20 of the electrical components 18 as the electrical components pass over the supporting shoe 110.

The heaters 26 and 30 are mounted on the supporting plate 12 at opposite sides of the coating station 28 and over the endless chain 14. The heaters 26 and 30 may be any type of heater, such as an electrical resistance heater, mounted in a reflector casing to direct the heat against the electrical components 18 as they are carried by the endless chain 14 through the heaters. As shown by FIGURE 6, the casing of the heater 26 has an arm 182 which extends under the endless chain 14 and which is covered by a thermal insulating material 184 so as to prevent heating of the plastic coating material on the endless belt 32.

OPERATION OF APPARATUS

In the operation of the coating apparatus 10, the motor 52 is turned on to drive the endless chain 14 and rotate the plates 82a and 82b of the position-adjusting mechanism, the motor 122 is turned on to drive the endless belt 32, the motor 148 is turned on to rotate the doctor wheel 144 and the vibrator 130 is turned on to feed the particles of the plastic coating material down the feeder hopper 126. The individual electrical components 18 are mounted on the chucks 16 as the chucks pass over the guide rail 76. This is achieved by inserting a terminal wire 20 of each electrical component 18 into the passage 64 of a chuck 16 until the terminal wire passes under and is gripped by the arm of the spring clip 72.

The endless chain 14, which is moving in the direction of arrow 22, carries the electrical components 18, which are mounted in the chucks 16, first to the position adjusting mechanism 24. At the position adjusting mechanism 24, the free terminal wire 20 of each electrical component 18 passes between the rotating plates 82a and 82b as shown in FIGURE 2. The end surface of the body portion 40 of the electrical component 18 is engaged by the periphery of the rotating plates 82a and 82b so that the body position 40 is pushed toward the chuck 16 to a position where the body portion is in direct alignment with the supporting shoe 110 of the coating station 28. Thus, the electrical components 18 are properly aligned for the coating operation. From the position-adjusting mechanism 24, the electrical components 18 are carried through the heater 26 where they are heated to a temperature at least as high as the fusion temperature of the plastic coating material. As the electrical components are carried through the heater 26, the gears 62 on the chuck mounting pins 60 mesh with the teeth of the gear rack 80. This rotates the chucks 16 and the electrical components 18 to insure proper heating of the electrical components.

At the same time, the vibrator 130 vibrates the feeder hopper 126 so that the particles of the plastic coating material move toward the front end of the hopper and fall through the nozzle 128 onto the moving endless belt 32. This forms a layer of the plastic coating material on the endless belt 32 which is carried past the doctor mechanism 38 to the coating station 28. As the layer of the plastic coating material passes the doctor mechanism 38, the rotating doctor wheel 144 rolls over the layer of the plastic coating material to compact the layer and form a layer of uniform thickness. The thickness of the layer of the plastic coating material depends on the spacing between the periphery of the doctor wheel 144 and the top surface of the endless belt 32. Any excess plastic coating material which may fall from the endless belt 32 will fall into the overflow funnel 134 and will be carried thereby to the collector can 136 for reuse. After the endless belt 32 passes the doctor wheel 144, it rides along the supporting rail 162 which prevents excess vibration of the endless belt. However, if any of the plastic coating material falls from the endless belt 32 between the doctor wheel 144 and the coating station 28, such material will fall into the funnel 140 and will be carried by the tube 142 to the collector can 136 for reuse.

The body portion 40 of the electrical components 18 and the layer of the plastic coating material on the endless belt 32 come together at the coating station as they pass over the supporting shoe 110. The position of the supporting shoe 110 is adjusted so that the surface of the body portion 40 contacts the plastic coating material. Since each of the body portions 40 are heated to a temperature at least as high as the fusion temperature of the plastic coating material, the coating material adheres and fuses to the body portion. Since the electrical component 18 is being rotated by the gear 62 meshing with the rack 80, the body portion 40 is rolled over the layer of the plastic coating material. Thus, a film of the coating material is applied to each body portion 40 around the entire surface of the body portion. The thickness of the layer of the coating material applied to each body portion 40 can be controlled by controlling the thickness of the layer of the coating material on the endless belt 32 and the spacing of the endless belt and the body portion at the coating station 28. Since only the body portion 40 of each electrical component 18 contacts the plastic coating material, only the body portion is coated with the plastic coating material with none of the coating material being applied to the terminal wires 20. Any excess coating material which may fall from the endless belt 32 falls into the collector tubes 168 and 170 through the slots 174 and 176 and is carried away by the suction applied through the pipe 172.

The coated electrical components 18 are then carried through the heater 30 where they are reheated to insure complete fusion of the plastic coating material. The coated electrical components 18 are then carried back to the guide rail 76 where they are removed from the chucks 16 so that new, uncoated electrical components can be inserted in the chucks. Thus, there is provided an apparatus and method for coating the body portion of electrical components with a protective plastic jacket of uniform and controlled thickness with none of the plastic coating material being coated on the terminal wires of the electrical component.

I claim:

1. Apparatus for coating electrical components of the type having a central body portion and at least one terminal wire extending from the body portion with a protective plastic jacket which surrounds the body portion comprising an endless belt mounted for movement in a vertical plane,
means for feeding particles of the plastic coating material onto the surface of said endless belt to form a layer of said plastic coating material on the endless belt,
a movable conveyor,
means on said conveyor for individually supporting the electrical components to be coated by the terminal wires of the electrical components,
said conveyor being movable in a path to bring the body portions of the electrical components into contact with the layer of the plastic coating material on the endless belt,
means for heating the electrical components to a temperature at least as high as the fusion temperature of the plastic coating material before the electrical components are brought into contact with the plastic coating material, and
means for rotating the electrical components while the electrical components are in contact with the plastic coating material so as to fuse a film of the plastic material to the surface of the body portions of the electrical components.

2. Apparatus in accordance with claim 1 including a vertical supporting plate, the endless belt being mounted on one surface of said supporting plate, and the conveyor comprises an endless chain mounted on said one surface of the supporting plate and substantially encircling the endless belt.

3. Apparatus in accordance with claim 2 in which the means for supporting the electrical components on the endless chain comprise a plurality of chucks mounted on said endless chain in side-by-side, parallel relation with each of said chucks being rotatable about its longitudinal axis, and the means for rotating the electrical moponents rotates the chucks.

4. Apparatus in accordance with claim 3 in which each of the chucks is mounted on the end of a separate shaft which is rotatably mounted on the endless chain and the means for rotating the electrical components comprises a separate gear mounted on each of the chuck shafts and a toothed rack is mounted on the supporting plate and extends along the portion of the path of the endless chain where the electrical components are brought into contact with the coating material, the teeth of the rack meshing with the gears so as to rotate the chucks.

5. Apparatus in accordance with claim 4 in which the means for feeding the particles of the plastic coating material onto the endless belt comprises a hopper extending substantially horizontal over the endless belt, an opening in the bottom of said hopper over the surface of the endless belt, means for vibrating said hopper to feed the coating material to said opening, and an overflow funnel mounted beneath the endless belt and under the opening in the hopper to catch any excess of the coating material which may fall from the endless belt.

6. Apparatus in accordance with claim 5 including a doctor wheel rotatably supported on the supporting plate with the peripheral surface of the doctor wheel being directly overhead slightly spaced above the endless belt on the side of the feeder hopper toward which the endless belt is moving so that the peripheral surface of the doctor wheel engages the layer of the plastic coating material on the endless belt to adjust the thickness of said layer.

7. Apparatus in accordance with claim 6 including means for rotating the doctor wheel and means for adjusting the spacing between the peripheral edge of the doctor wheel and the endless belt.

8. Apparatus in accordance with claim 7 including a supporting shoe mounted on the supporting plate beneath the endless belt at the portion of travel of the endless belt that the electrical components are brought into contact with the layer of the plastic coating material with the endless belt slidably engaging a surface of said supporting shoe.

References Cited

UNITED STATES PATENTS

| | | | |
|---|---|---|---|
| 1,259,925 | 3/1918 | Stommel | 118—257 XR |
| 2,224,496 | 12/1940 | Wild et al. | 118—232 XR |
| 2,468,922 | 5/1949 | Cook | 118—232 XR |
| 2,968,278 | 1/1961 | Wolfe | 118—257 |
| 3,388,686 | 6/1968 | Cohan | 118—232 XR |

WALTER A. SCHEEL, Primary Examiner

R. I. SMITH, Assistant Examiner

U.S. Cl. X.R.

118—239, 246, 257